United States Patent
Reyes Marcial

(10) Patent No.: US 11,066,020 B2
(45) Date of Patent: Jul. 20, 2021

(54) VEHICLE BODY STRUCTURE

(71) Applicant: Nissan North America, Inc., Franklin, TN (US)

(72) Inventor: Jesús Reyes Marcial, Temoaya (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 43 days.

(21) Appl. No.: 16/719,655

(22) Filed: Dec. 18, 2019

(65) Prior Publication Data

US 2021/0188180 A1   Jun. 24, 2021

(51) Int. Cl.
  *B60R 7/02* (2006.01)
  *B62D 25/08* (2006.01)
  *B60R 13/01* (2006.01)

(52) U.S. Cl.
  CPC .............. *B60R 7/02* (2013.01); *B60R 13/013* (2013.01); *B62D 25/087* (2013.01)

(58) Field of Classification Search
  CPC ........ B60R 7/02; B60R 13/013; B62D 25/087
  USPC ..................................................... 296/37.14
  See application file for complete search history.

(56) References Cited

U.S. PATENT DOCUMENTS

| | | | | |
|---|---|---|---|---|
| 5,257,846 A | * | 11/1993 | Kanai ........................ | B60R 5/04 16/359 |
| 5,469,999 A | * | 11/1995 | Phirippidis ................ | B60R 5/04 220/23.4 |
| 5,492,257 A | * | 2/1996 | Demick .................... | B60R 7/02 224/275 |
| 5,636,890 A | * | 6/1997 | Cooper ..................... | B60R 7/02 29/401.1 |
| 5,836,637 A | * | 11/1998 | Laginess ................. | B60N 3/063 296/75 |
| 6,027,155 A | * | 2/2000 | Wisniewski .............. | B60R 7/02 296/37.1 |
| 6,752,304 B1 | * | 6/2004 | Hotary ................... | B60K 37/00 224/544 |
| 7,131,684 B1 | * | 11/2006 | Gooding ................. | B60J 7/141 296/100.09 |
| 9,073,488 B1 | | 7/2015 | Stanczak et al. | |
| 9,096,178 B1 | | 8/2015 | Stanczak et al. | |
| 9,278,647 B2 | | 3/2016 | Stanczak et al. | |
| 9,376,147 B2 | * | 6/2016 | Craven ..................... | B60R 5/04 |
| 9,676,339 B2 | * | 6/2017 | Huebner ................. | B60R 5/045 |
| 9,994,259 B2 | * | 6/2018 | Jhant ........................ | B60R 7/00 |

(Continued)

*Primary Examiner* — Pinel E Romain
(74) *Attorney, Agent, or Firm* — Global IP Counselors, LLP

(57) ABSTRACT

A vehicle body structure that includes a storage structure, at least one fixed cover and at least on sliding cover. The storage structure defines at least one opening and at least one storage space, the at least one opening exposing the at least one storage space. The fixed cover is non-movably fitted to the storage structure covering a first portion of the opening. The sliding cover is installed to the storage structure for sliding movement along the opening such that in a closed orientation, the sliding cover covers a second portion of storage space such that the fixed cover and the sliding cover completely conceal the storage space, and, in an open orientation the sliding cover exposes the second portion of the storage space. The storage structure is dimensioned and contoured to removably install to a rear interior cargo area of a passenger vehicle.

20 Claims, 10 Drawing Sheets

(56) References Cited

U.S. PATENT DOCUMENTS

| | | | | |
|---|---|---|---|---|
| 2008/0061576 | A1* | 3/2008 | Hwang | B60R 7/02 296/37.5 |
| 2010/0090502 | A1* | 4/2010 | Mercurio | B60R 5/04 296/193.07 |
| 2012/0100337 | A1* | 4/2012 | Suzuki | B32B 5/26 428/116 |
| 2013/0153523 | A1* | 6/2013 | Bernert | B60R 11/02 211/86.01 |
| 2018/0015882 | A1* | 1/2018 | Kim | B60R 7/02 |
| 2019/0291649 | A1* | 9/2019 | Ito | B60R 5/045 |
| 2020/0086799 | A1* | 3/2020 | Aguilar Ruelas | B60R 7/02 |

* cited by examiner

VEHICLE BODY STRUCTURE

BACKGROUND

Field of the Invention

The present invention generally relates to a vehicle body structure that includes a storage structure. More specifically, the present invention relates to vehicle body structure that includes a storage structure installed to a rear interior cargo area of the vehicle.

Background Information

Vehicles, such as sports utility vehicles or SUV's often include a rear interior cargo area.

SUMMARY

One object of the present disclosure is to provide a rear interior cargo area of a vehicle with a storage structure having at least one storage space with a sliding cover that moves between an open orientation exposing the storage space and a closed orientation covering the storage space.

Another object of the present disclosure is to provide a rear interior cargo area of a vehicle with a storage structure that is removable and re-installable.

Another object of the present disclosure is to provide a rear interior cargo area of a vehicle with a storage structure that covers and conceals a spare tire storage space and spare tire stored therein.

In view of the state of the known technology, one aspect of the present disclosure is to provide a vehicle body structure with a storage structure that includes at least one fixed cover and at least one sliding cover. The storage structure has an upper surface defining at least one opening and a lower surface with at least one storage space defined between the upper surface and the lower surface. The at least one opening exposes the at least one storage space. The at least one fixed cover is non-movably fitted to the storage structure covering a first portion of the at least one storage space. The at least one sliding cover is installed to the storage structure for sliding movement along the opening such that in a closed orientation, the at least one sliding cover covers a second portion of at least one storage space such that the at least one fixed cover and the at least one sliding cover completely conceal the at least one storage space, and, in an open orientation the at least one sliding cover exposes the second portion of the at least one storage space, the storage structure being dimensioned and contoured to removably install to a rear interior cargo area of a passenger vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
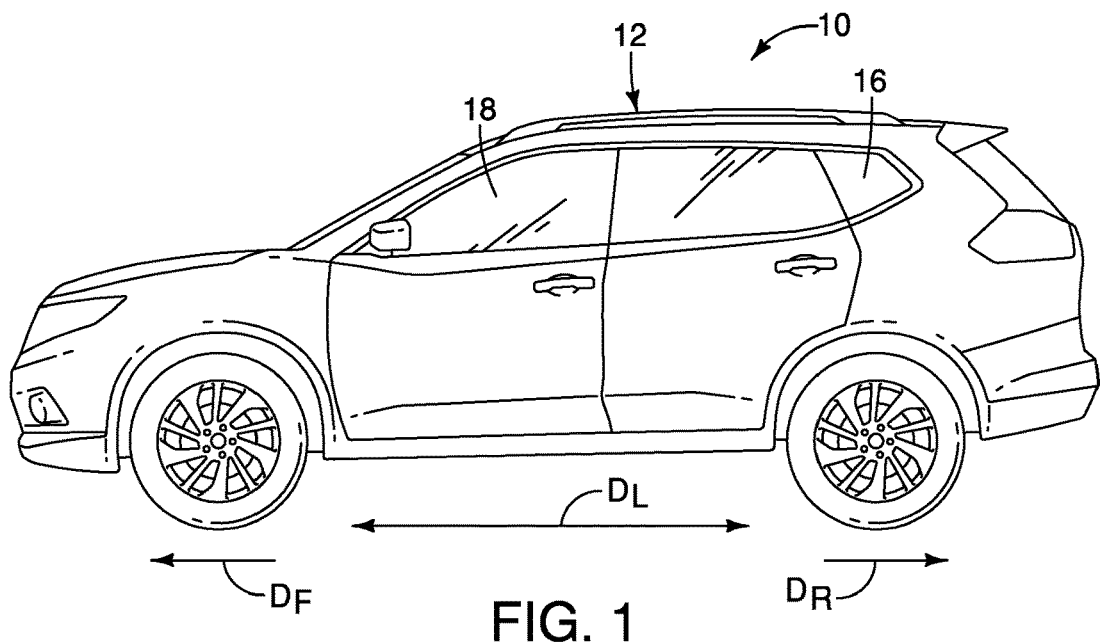
FIG. 1 is a side view of a vehicle with a vehicle body structure that defines a passenger compartment and a rear interior cargo area in accordance with one embodiment.
Figure 2:
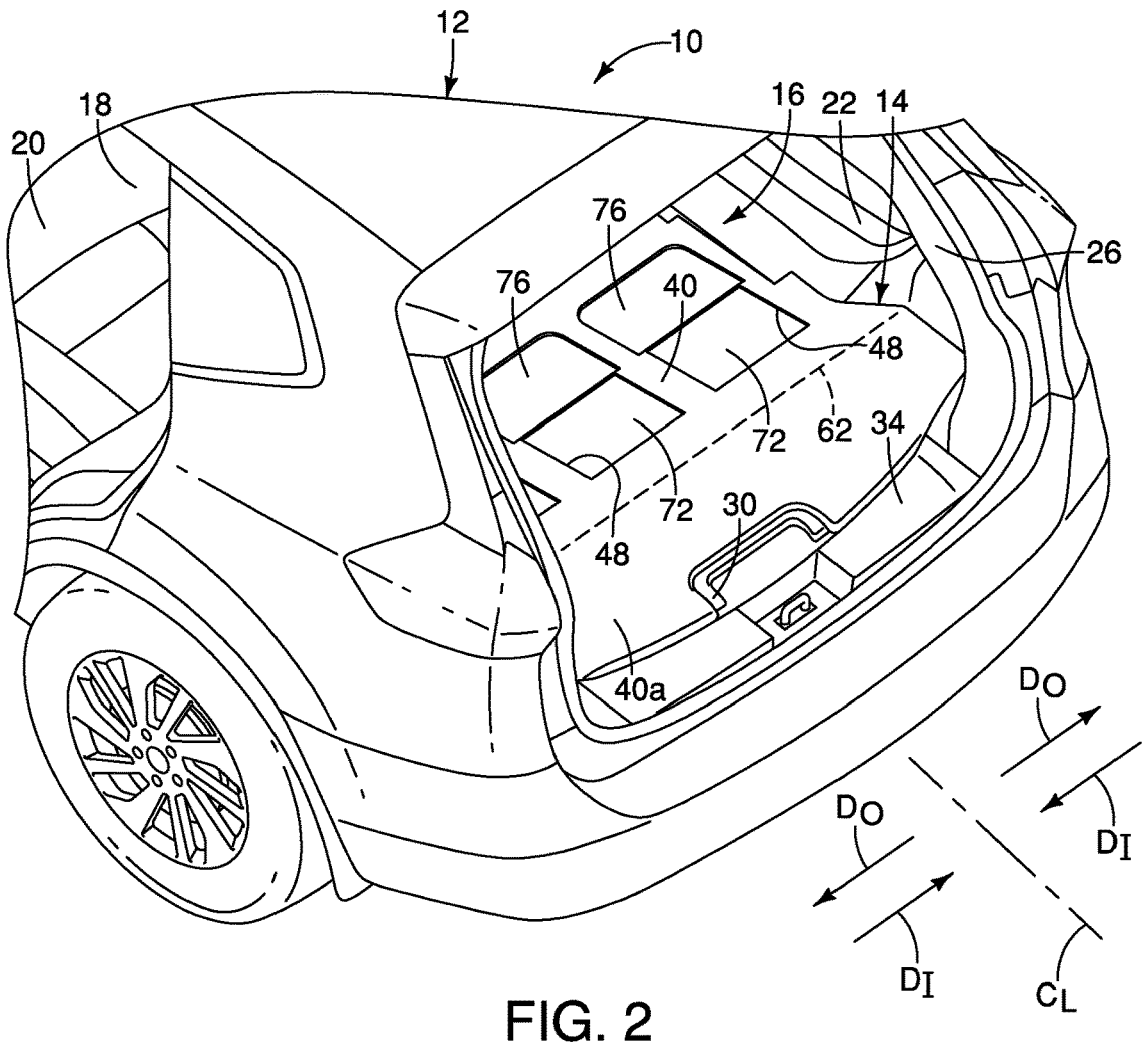
FIG. 2 is a rear perspective view of the vehicle depicted in FIG. 1, showing a rear opening with a rear door removed to show the rear interior cargo area that includes a storage structure removably installed therein in accordance with the one embodiment.

Referring initially to FIG. 1, a vehicle 10 having a vehicle body structure 12 with a storage structure 14 (FIG. 2) is illustrated in accordance with a first embodiment. As shown in FIG. 2, the storage structure 14 is removably installed to a rear interior cargo area 16 defined within the vehicle body structure 12 of the vehicle 10.

In FIG. 1, the vehicle 10 is depicted as an SUV (sports utility vehicle). However, it should be understood from the drawings and the description herein that the vehicle 10 can be any vehicle design that includes a rear interior cargo area such as or similar to the rear interior cargo area 16 described herein below.

As shown in FIGS. 1 and 2, the vehicle 10 defines a vehicle longitudinal direction $D_L$, a vehicle forward direction $D_F$, a vehicle rearward direction $D_R$, inboard directions $D_I$ and outboard directions $D_O$. As indicated in FIG. 2, the vehicle 10 defines a center line $C_L$ that extends in the vehicle longitudinal direction $D_L$. The inboard directions $D_I$ and outboard directions $D_O$ are defined relative to the center line $C_L$ in a conventional manner.

Figure 3:
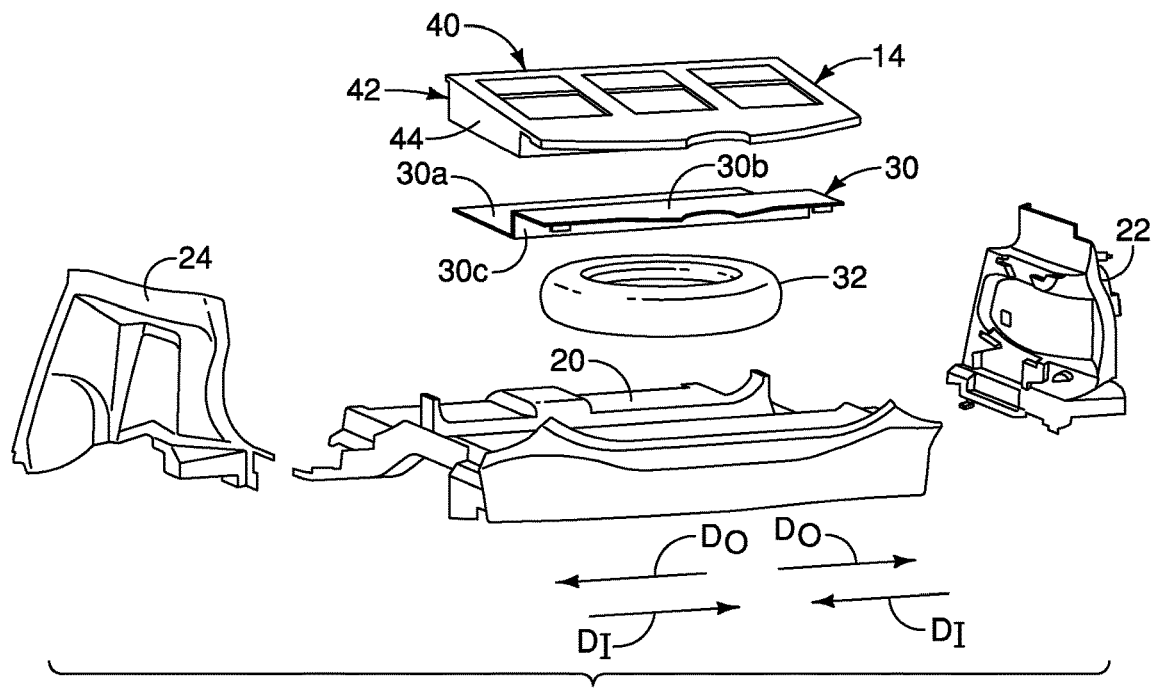
FIG. 3 is an exploded view of elements within and around the rear interior cargo area including a spare tire, a tire cover panel, side walls and the storage structure in accordance with the one embodiment.
Figure 4:
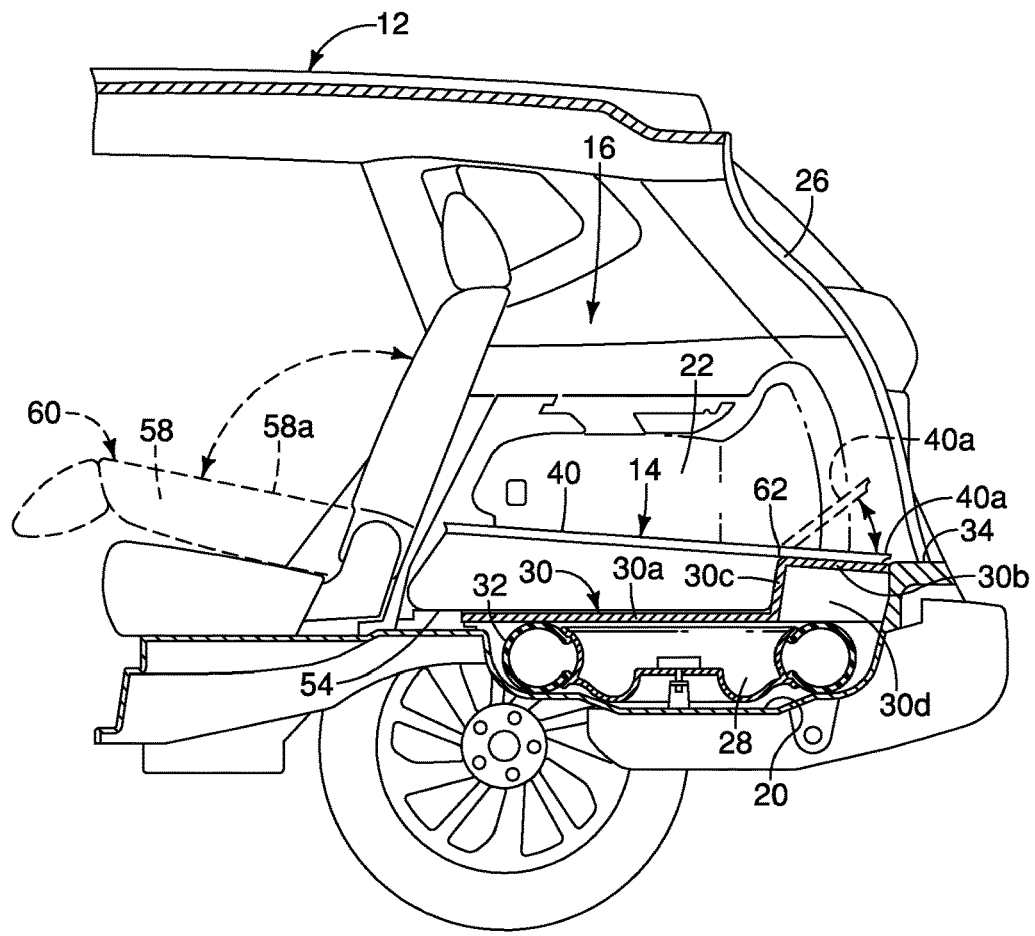
FIG. 4 is cross-sectional side view of the vehicle showing many of the elements of the rear interior cargo area and the storage structure in accordance with the one embodiment.

As shown in FIGS. 1, 2 and 4, the vehicle body structure 12 defines a passenger compartment 18 that is located forward of the rear interior cargo area 16. As shown in FIGS. 2, 3 and 4, the vehicle body structure 12 includes at least a vehicle floor 20, a first side wall 22 and a second side wall 24. The rear interior cargo area 16 is defined above the vehicle floor 20 and between the first and second side walls 22 and 24. The rear interior cargo area 16 is accessed via a rear opening 26 (FIG. 4) that is accessible via the opening and closing of a rear cargo door (not shown). As shown in FIGS. 3 and 4, the rear interior cargo area 16 defines a spare tire storage space 28 that is concealed by a tire cover panel 30 that is positioned between the first and second side walls 22 and 24 overlaying and covering the spare tire storage space 28. A spare tire 32 can be stored in the spare tire storage space 28 and is also concealed by the tire cover panel 30. The tire cover panel 30 is designed and configured such that it can be raised to expose the spare tire 32 and tools (not shown) stored with the spare tire 32.

Figure 5:
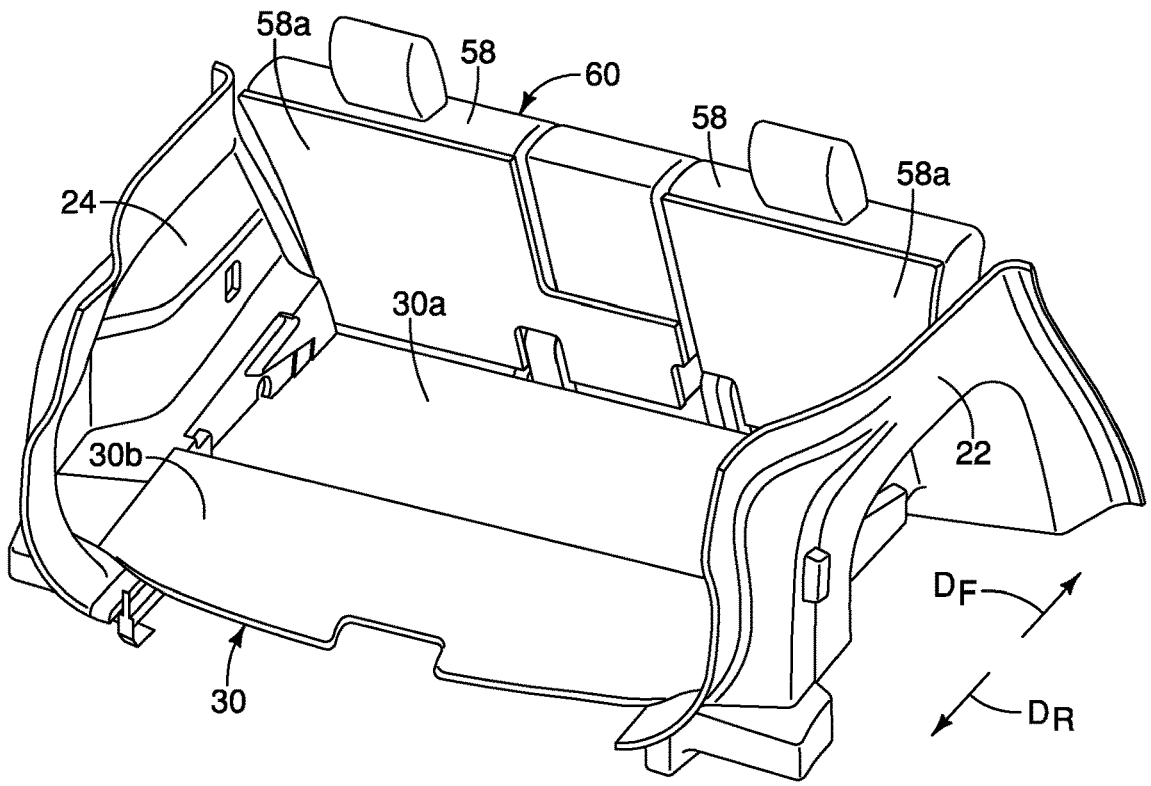
FIG. 5 is a perspective view of the elements of and around the rear interior cargo area removed from the vehicle with the storage structure removed in accordance with the one embodiment.

As shown in FIGS. 4 and 5, the tire cover panel 30 includes a forward portion 30a, a rearward portion 30b and an upright portion 30c located between the forward portion 30a and the rearward portion 30b. The forward portion 30a is configured to rest immediately above or directly on the spare tire 32. The rearward portion 30b located at a height that is above the forward portion 30a, with the upright portion 30c extending therebetween. The vertical offset between the forward portion 30a and the rearward portion 30b provides an additional storage area 30d (FIG. 4) below the rearward portion 30b. The intersection between the upright portion 30c and the rearward portion 30b can be provided with a hinge (not shown) that can be a mechanical hinge or a living hinge such that the rearward portion 30b can be pivoted upward exposing the additional storage area 30d.

The spare tire storage space 28 is located well below a sill 34 that defines a lower end of the rear opening 26. Consequently, there is space above the tire cover panel 30 to receive the storage structure 14.

A description of the storage structure 14 is now provided with specific reference to FIGS. 6-21.

Figure 6:
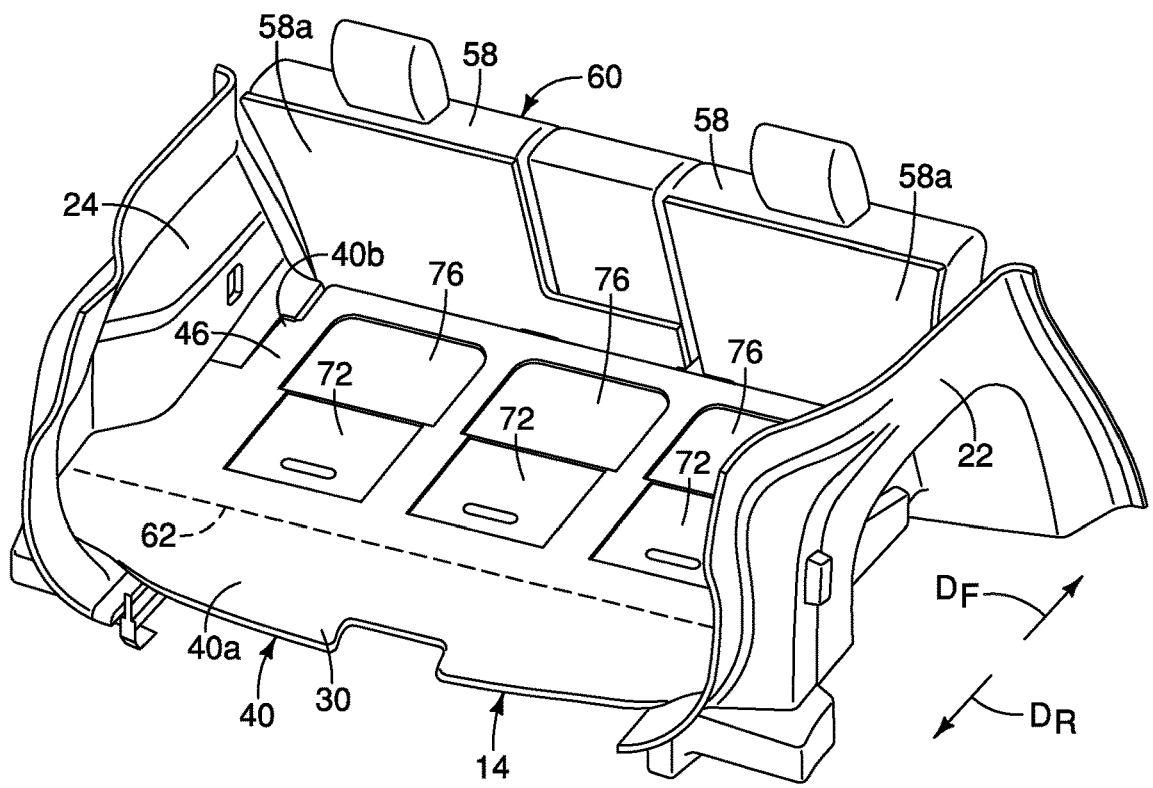
FIG. 6 is another perspective view of the elements of and around the rear interior cargo area similar to FIG. 5, showing the storage structure installed in accordance with the one embodiment.
Figure 7:
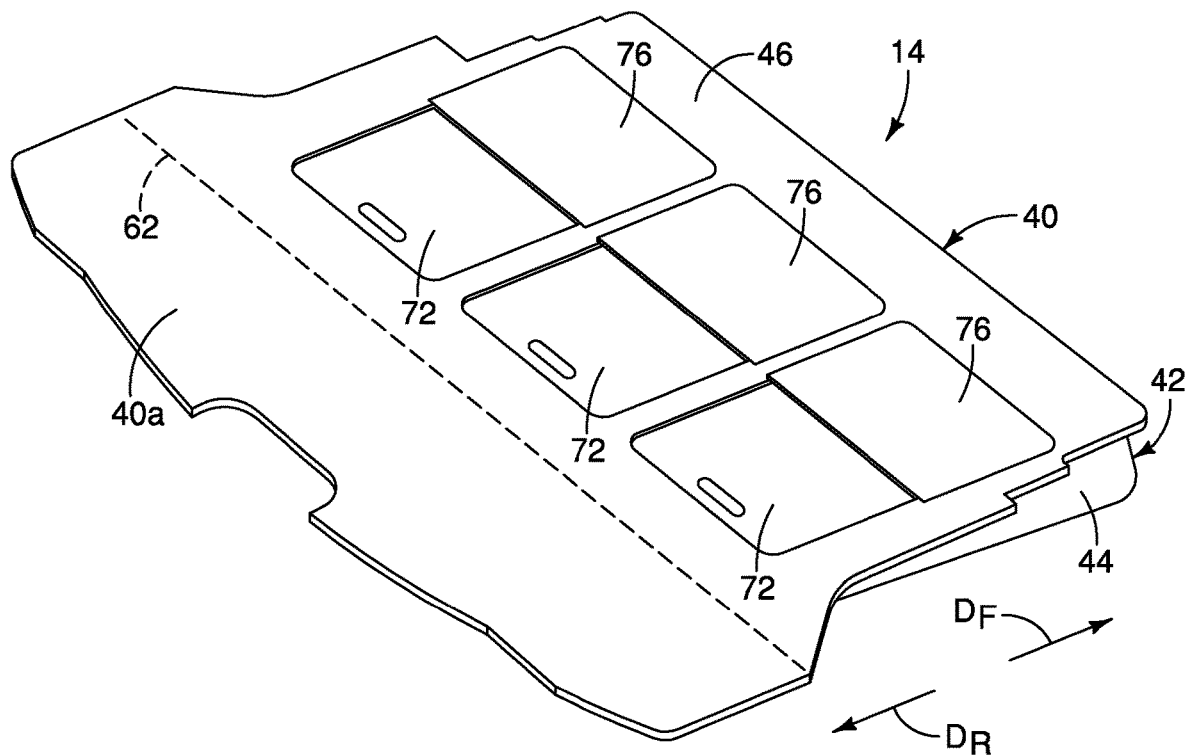
FIG. 7 is a perspective view of the storage structure removed from the vehicle with sliding doors in a closed orientation and fixed covers installed to the storage structure in accordance with the one embodiment.
Figure 8:
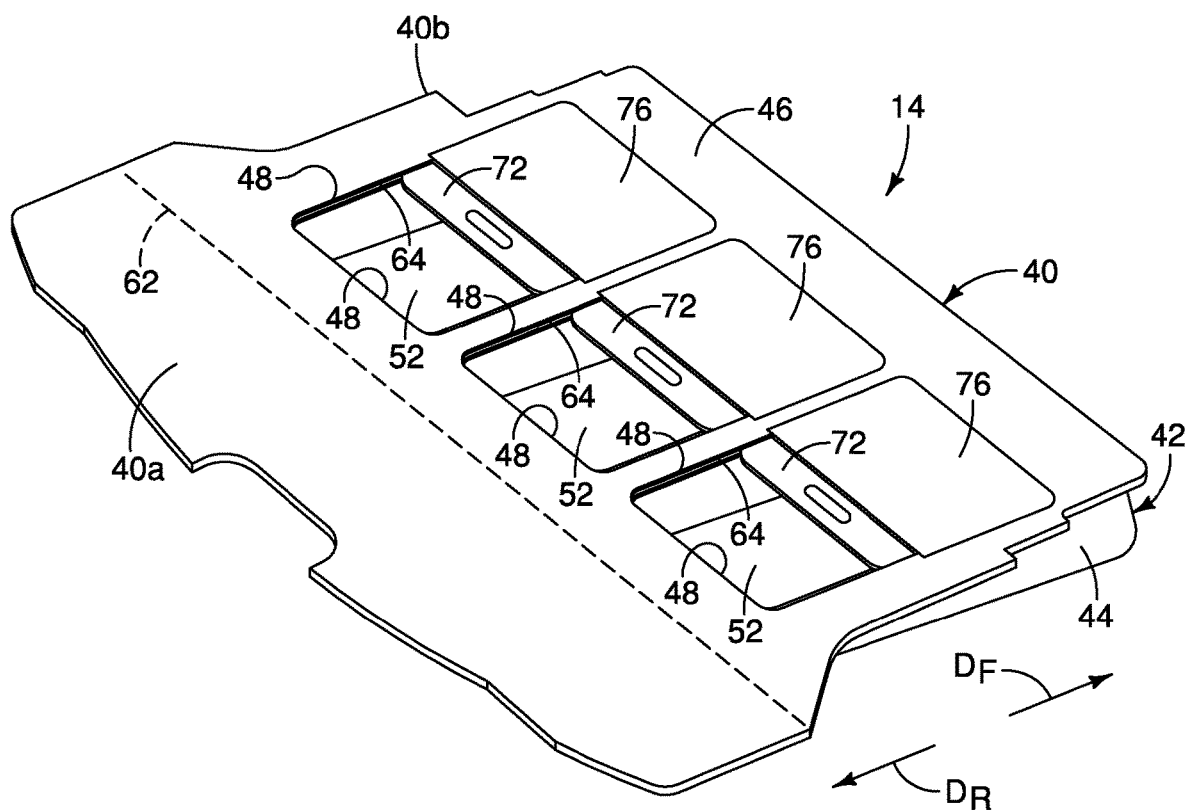
FIG. 8 is another perspective view of the storage structure similar to FIG. 7 with the fixed covers covering and concealing respective portions of the storage spaces and with the sliding covers in open orientations exposing corresponding portions of storage spaces in accordance with the one embodiment.
Figure 9:
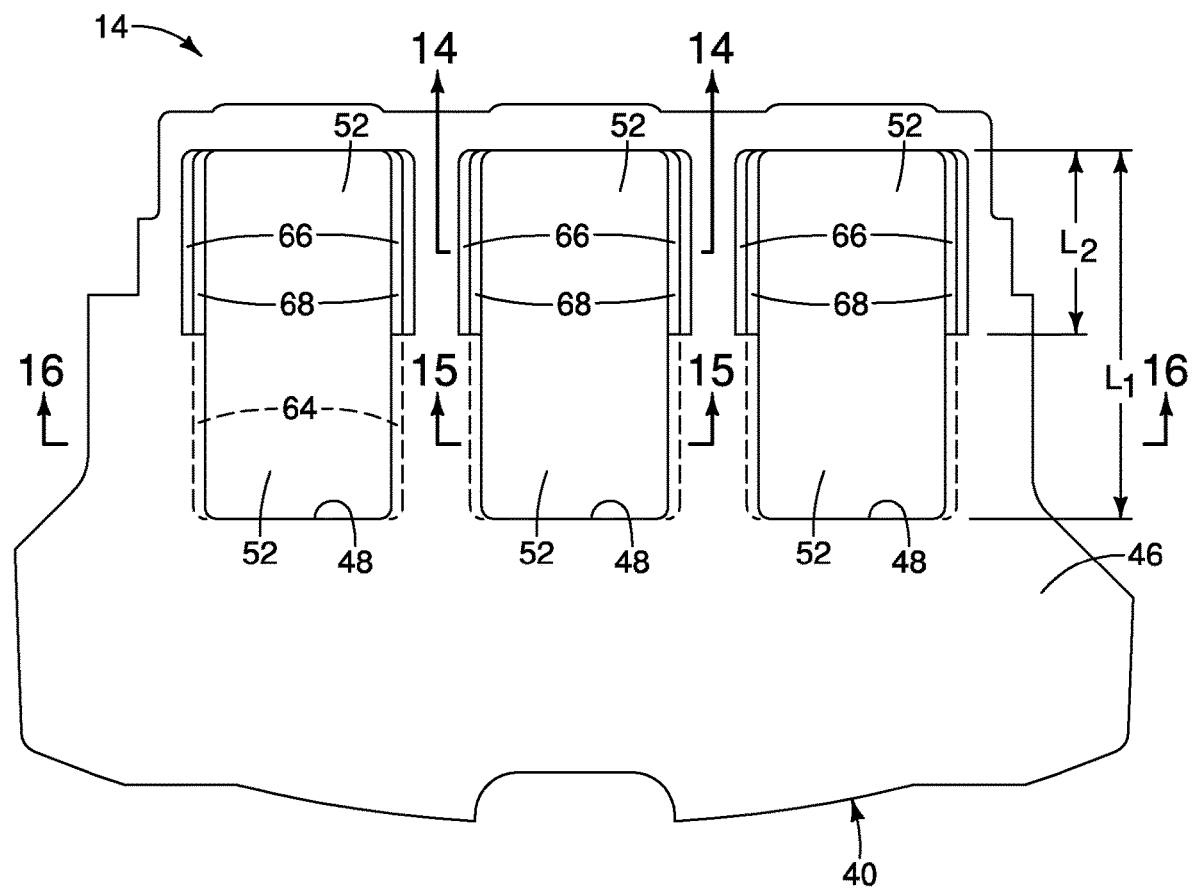
FIG. 9 is a top view of the storage structure with the sliding doors and fixed doors removed showing three separate storage spaces, recesses dimensioned to retain the fixed covers and sections of elongated track portions in accordance with the one embodiment.

As shown in FIGS. 6, 7 and 8, the storage structure 14 has an upper panel 40, a lower section 42 and upright wall portions 44. The upper panel 40 defines an upper surface 46 that includes at least one opening 48. In the depicted embodiment, there are three openings 48. In an alternative embodiment (not shown) the upper panel 40 and the upper surface 46 can be provided with only two openings 48, depending upon the overall design of the storage structure 14.

The lower section 42 and the upright wall portions 44 define at least one storage bin or storage space 52. In the depicted embodiment there are three separate storage spaces 52 in the depicted embodiment defined and surrounded by the upright wall portions 44. In the depicted embodiment, each of the three storages spaces 52 has the same overall dimensions and shape, and hence are basically identical. However, in an alternative embodiment (not shown) the storage spaces 52 can be provided with differing dimensions (not identical).

The lower section 42 defines lower surface sections 54 that are co-planar. Specifically, each of the storage spaces 52 has a bottom wall that includes a lower surface section 54. For the sake of simplicity and brevity, the three lower surface sections 54 are also referred to collectively as the lower surface 54 of the storage structure 14.

As shown in FIGS. 10-13, each of the storage spaces 52 is defined between the upper surface 46 and the lower surface 54. Further, as shown in FIGS. 7 and 8, each of the openings 48 is aligned with and is open to a corresponding one of the storage spaces 52. Further, as is also shown in FIGS. 10-13, the upper surface 46 and the lower surface 54 are not parallel to one another.

As shown in FIG. 4, upper cushions 58 of rear seats 60 of the vehicle 10 can be moved from an upright orientation (solid lines) to a folded down orientation (phantom lines). With the upper cushions 58 in the folded down orientation (phantom lines), the upper surface 46 of the storage structure 14 is approximately co-planar with the upwardly facing surface 58a of the upper cushions 58, creating a large storage surface upon which cargo can be placed, or a large pet (i.e. a dog) can lay. However, it should be understood from the drawings and the description herein that regardless of the orientation of the upper cushions 58, the upper surface 46 of the upper panel 40 can provide a convenient place to put a dog or other pet when using the vehicle 10.

In the depicted embodiment, the lower section 42, including at least the lower surface sections 54 and the upright wall portions 44, are formed as a single, unitary, monolithic member or element. Alternatively, the lower section 42, the upright wall portions 44, the lower surface sections 54 and the upper panel 40 can all be formed as a single, unitary, monolithic member or element. Still further, in yet another embodiment, the lower section 42, the upright wall portions 44, the lower surface sections 54 and the upper panel 40 can all be formed as separate elements or combinations of separate elements that are then assembled together to form the storage structure 14.

Consequently, the upper panel 40 can be formed integrally with the lower section 42 or can be a separate element fixed to the lower section 42. The upper panel 40 can be a single rigid panel, or can be formed with a hinged area 62 (for example, a living hinge or a mechanical hinge) such that a rearward portion 40a of the upper panel 40 can pivot, as shown in phantom in FIGS. 2 and 4. The rearward portion 40a is shown in phantom in FIG. 4 pivoted upward to expose the space beneath it. For example, as in the depicted embodiment, with the upper panel 40 is attached to or formed with the upright wall portions 44. Alternatively, the upper panel 40 can be a single rigid panel having a first section that extends over and along edges of the storage spaces 52 and a second section (corresponding to the rearward portion 40a) that is rigidly cantilevered rearward and away from the storage spaces 52.

As shown in FIGS. 8-15, the storage structure 14 includes elongated track portions 64 that extend along opposite sides of corresponding ones of the storage spaces 52. Specifically, each storage space 52 has a pair of the elongated track portions 64. The elongated track portions 64 are basically recesses formed below the upper surface 46 along opposite sides of the opening 48. For each storage space 52, the elongated track portions 64 basically extend the entire length of the corresponding storage space 52, as shown in FIGS. 9-13.

The storage structure 14 further includes recesses or recessed areas 66 that are formed along opposite sides of the openings 48 above the elongated track portions 64. Specifically, each opening 48 and storage space 52 includes recessed areas 66 along opposite sides of a forward area of the storage space 52. In other words, the recessed areas 66 do not extend the full length of each storage space 52 or opening 48. Rather, the recessed areas 66 extend a little more than half of the overall length of each of the openings 48, as shown in FIGS. 9-14. Each of the recessed areas 66 further define access areas 68 that are open to forward ends of the elongated track portions 64. More specifically, the elongated track portions 64, the openings 48 and storage spaces 52 all have an overall length $L_1$, as measured in the vehicle longitudinal direction $D_L$. The recessed areas 66 have an overall length $L_2$, as vehicle longitudinal direction $D_L$. The length $L_1$ and the length $L_2$ are preferably dimensioned such that the length $L_2$ is greater than 50% of the length $L_1$, but less than 60% of the length $L_1$.

The storage structure 14 further includes sliding covers 72, one sliding cover 72 for each of the storage spaces 52, and one fixed cover 76 for each of the storage spaces 52. Each of the sliding covers 72 is installed a corresponding pair of elongated track portions 64 such that each sliding cover 72 can be moved to slide back and forth along the elongated track portions 64. The sliding covers 72 are preferably provided with an overall length that is greater than the length $L_2$ such that with the sliding covers 72 in an open orientation (FIGS. 8, 13 and 17) the sliding covers 72 are exposed relative to the fixed covers 76.

Similarly, the storage structure 14 further includes the fixed covers 76, one fixed cover 76 for each of the storage spaces 52. Each of the fixed cover 76 is installed within a corresponding pair of the recessed areas 66 such that the fixed cover 76 covers a forward area of the storage space 52. The fixed covers 76 are preferably provided with an overall length that is approximately equal to the length $L_2$.

As shown in FIG. 7, with the sliding covers 72 slid rearward to corresponding closed orientations, the storage spaces 52 are covered and concealed by the sliding covers 72 and the fixed covers 76. The fixed covers 76 and the sliding covers 72 are dimensioned such that the fixed covers 76 overlap or cover a forward section of the sliding covers 72 with the sliding covers 72 in the closed orientation.

The fixed covers 76 can be fixed to the upper panel 40 by any of a variety of attachment configurations. For example, as shown in the depicted embodiment in FIG. 14, an upper edge of each of the recessed areas 66 can include a lip 66a. The lip 66a and the fixed covers 76 are dimensioned such that each of the fixed covers 76 snap-fits to the corresponding recesses 66, with the lips 66a flexing slightly to allow the snap-fit engagement to occur. Alternatively, the fixed covers 76 can be attached to the storage structure 14 via mechanical fasteners (not shown).

As shown in FIG. 8, with the sliding covers 72 slid forward to corresponding open orientations, the storage spaces 52 are exposed by the sliding covers 72 and are only partially covered mainly by the fixed covers 76.

A description of the assembly process of the sliding covers 72 and the fixed covers 76 to the storage structure 14 is now provided with specific reference to FIGS. 10-16.

Figure 10:
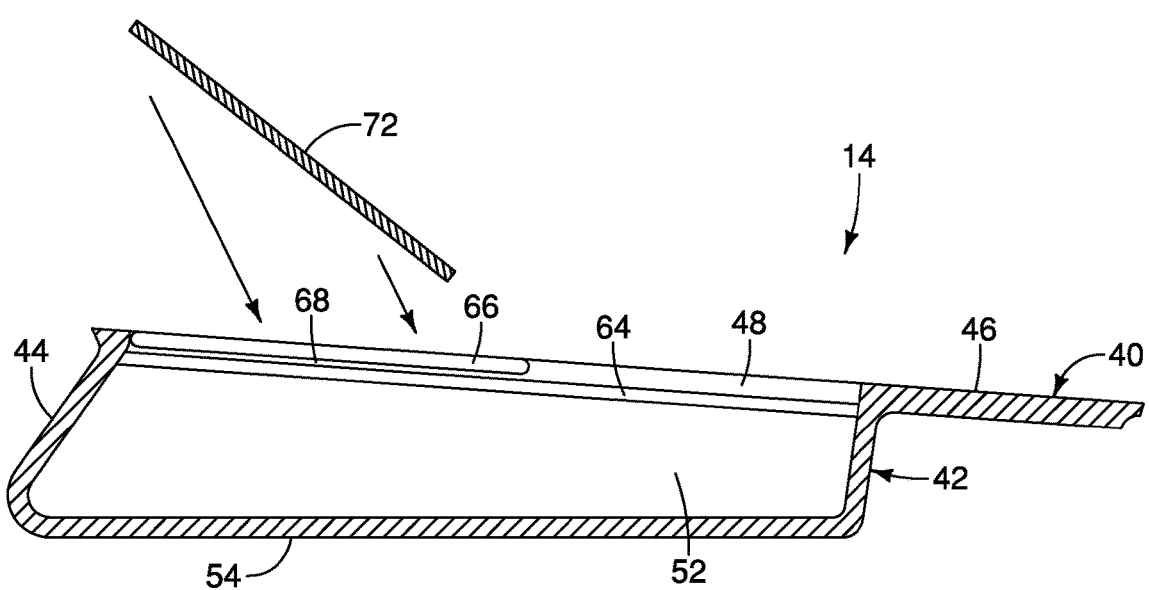
FIG. 10 is a cross-sectional side view of the storage structure showing one storage space, one of the elongated track portions and one of the recesses with one of the sliding covers prior to installation to the elongated track portions in accordance with the one embodiment.
Figure 14:
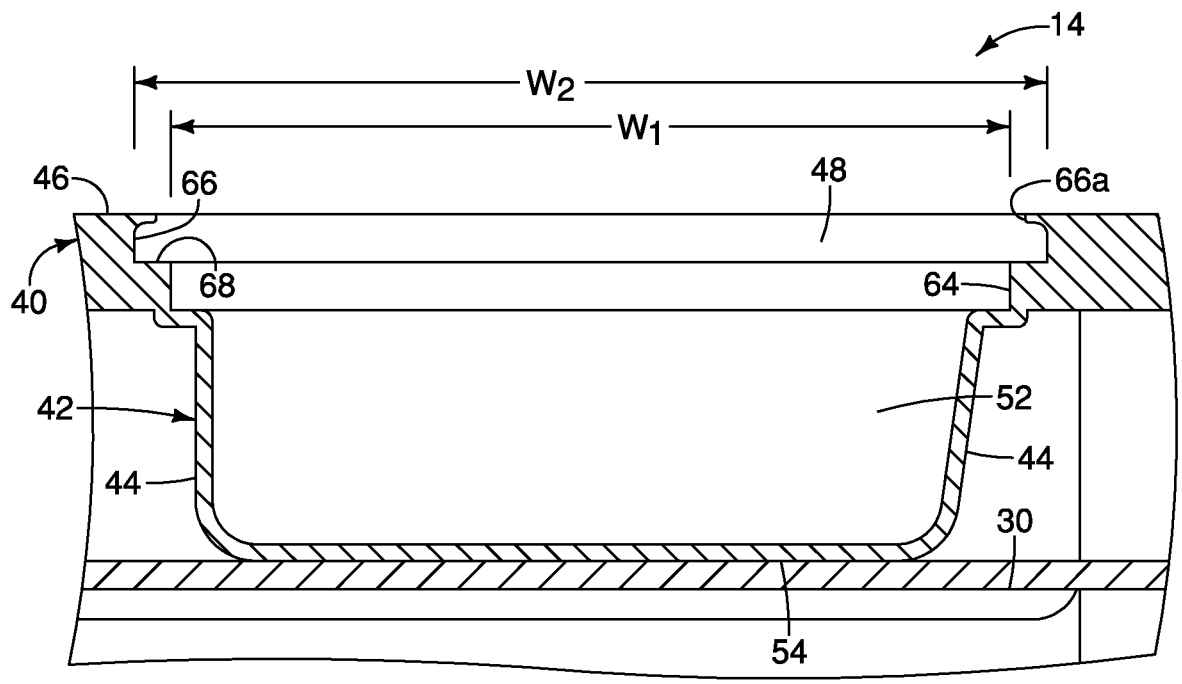
FIG. 14 is a cross-sectional view of a portion of the storage structure taken along the line 14-14 in FIG. 9 showing one of the storage spaces, the elongated tracks, the recesses and an access areas that are dimensioned such that the sliding cover can be installed to the elongated tracks in accordance with the one embodiment.
Figure 15:
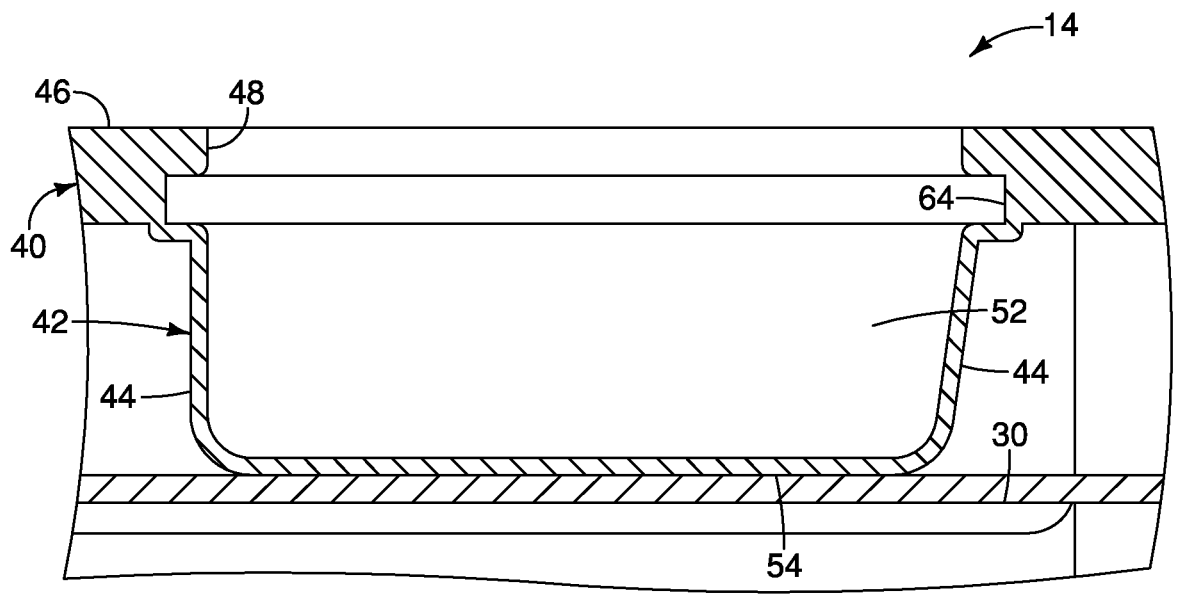
FIG. 15 is a cross-sectional view of a portion of the storage structure taken along the line 15-15 in FIG. 9 showing the storage space and the elongated tracks in accordance with the one embodiment.
Figure 16:
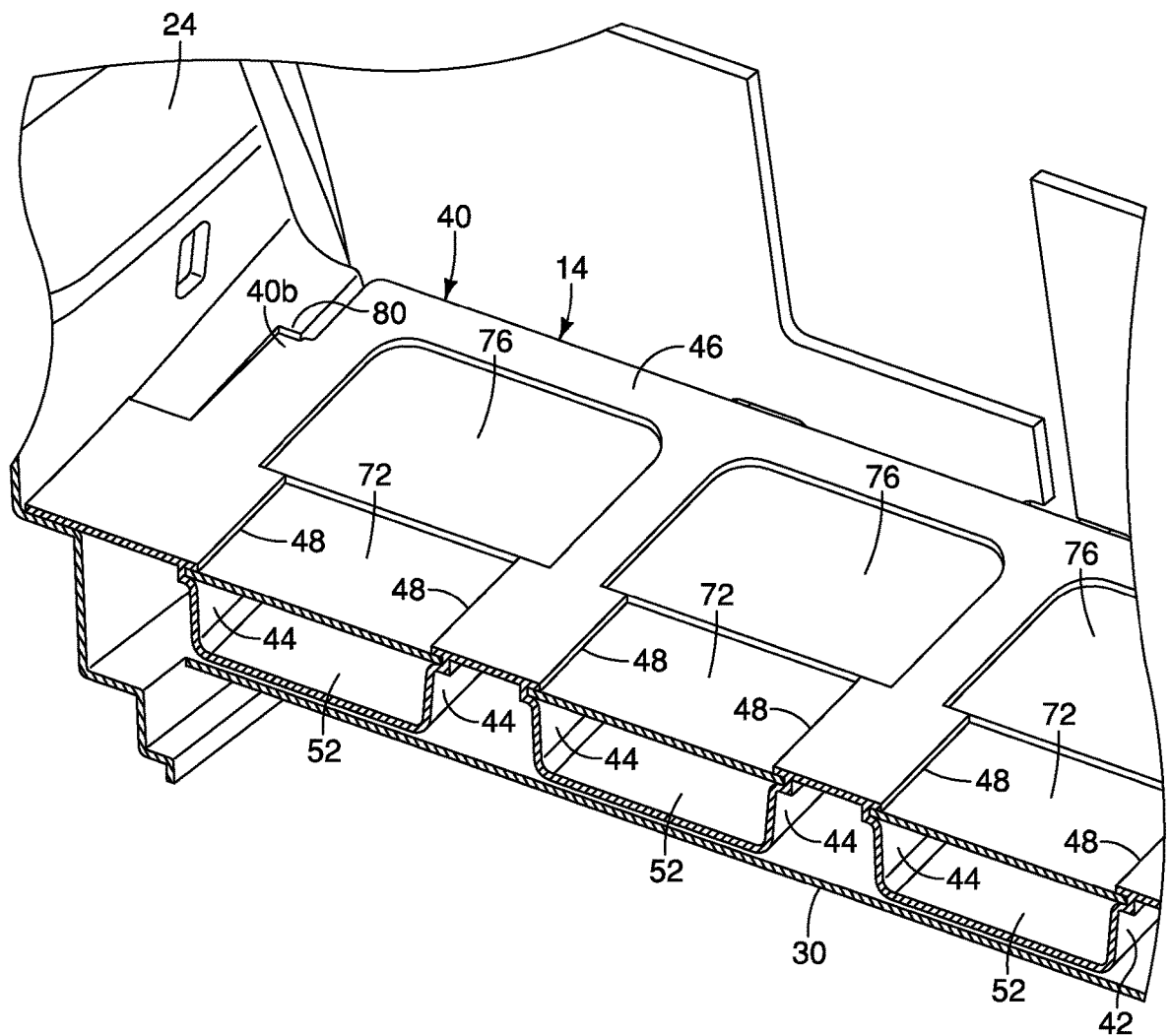
FIG. 16 is a cross-sectional view of the storage structure taken along the line 16-16 in FIG. 9 showing all three of the storage spaces and the elongated tracks in accordance with the one embodiment.
Figure 17:
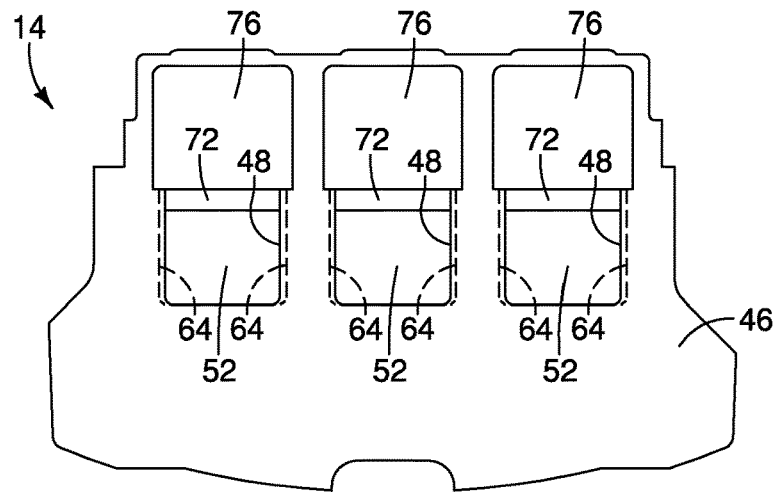
FIG. 17 is a top view of the storage structure with the sliding doors in the open orientation in accordance with the one embodiment.
Figure 18:
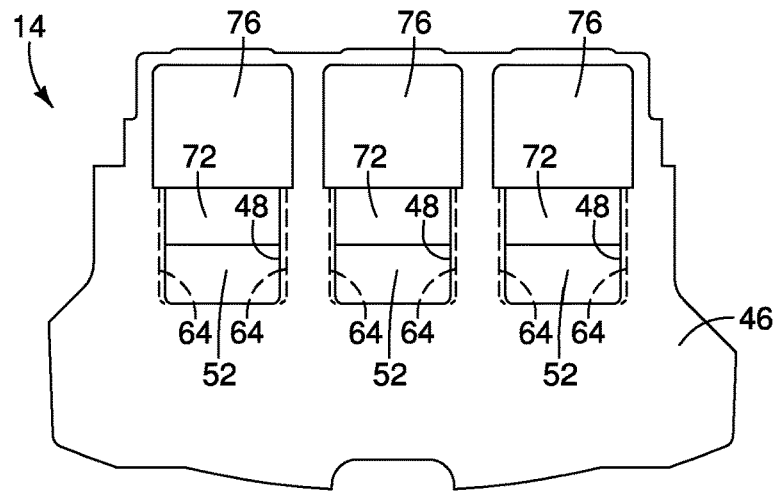
FIG. 18 is a top view of the storage structure with the sliding doors in a partially closed orientation in accordance with the one embodiment.
Figure 19:
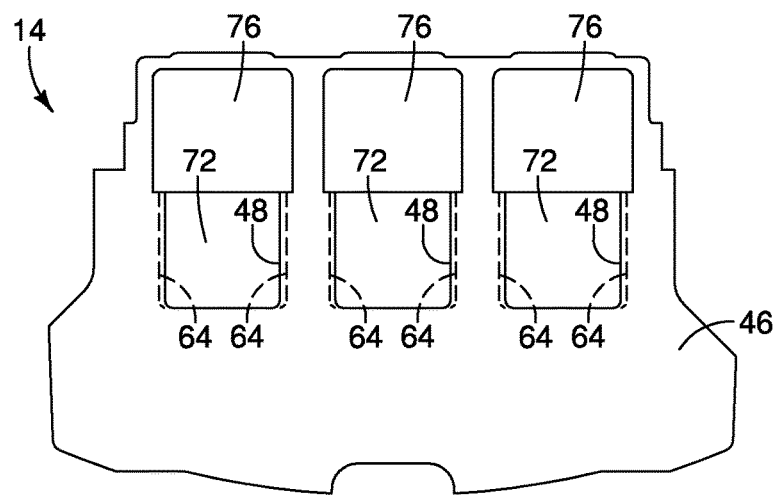
FIG. 19 is a top view of the storage structure with the sliding doors in the closed orientation in accordance with the one embodiment.

As shown in FIGS. 10 and 14 with the sliding covers 72 and the fixed covers 76 removed, the sliding cover 72 can be inserted into the elongated track portions 64 via space or access areas 68 provided by the absence of the fixed cover 76. Specifically, as shown in FIG. 14, the elongated track portions 64 are spaced apart from one another by a width $W_1$. The recessed areas 66 are spaced apart from one another by a width $W_2$ that is greater than the width $W_1$, thereby defining the access areas 68 that allows the sliding cover 72 to easily fit into the elongated track portions 64. As shown in FIG. 15, in an area of the storage space 52 rearward of the recessed areas 66 (in the absence of the recessed areas 66), the elongated track portions 64 is confined from above by portions of the upper panel 40 such that the sliding cover 76 cannot be lifted out of the elongated track portions 64.

Figure 11:
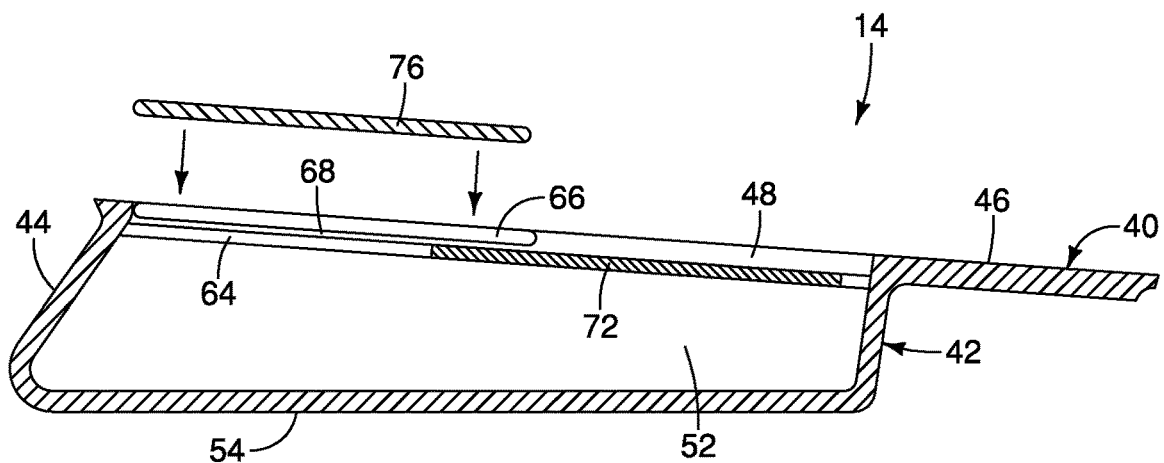
FIG. 11 is another cross-sectional side view of the storage structure similar to FIG. 10 showing the one of the sliding covers installed to the elongated track portions and slid to a rear portion of the elongated track portions covering part of the one storage space and with, one of the fixed covers prior to installation to the recesses in accordance with the one embodiment.

As shown in FIGS. 10 and 11, the sliding cover 72 is inserted through the opening 48 and into the elongated track portions 64. As further shown in FIGS. 12 and 13, the sliding cover 72 can then be slid along the elongated track portions 64 between the open orientation (FIG. 13) and the closed orientation (FIG. 12).

Figure 12:
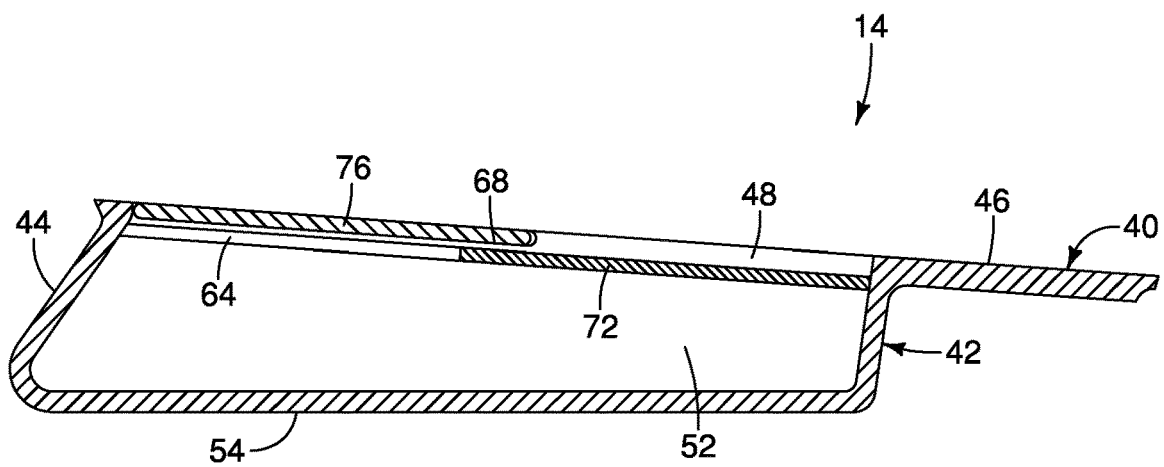
FIG. 12 is another cross-sectional side view of the storage structure similar to FIGS. 10 and 11 showing the one of the sliding covers installed to the elongated track portions side to the closed orientation and the fixed cover installed to the recesses in accordance with the one embodiment.
Figure 13:
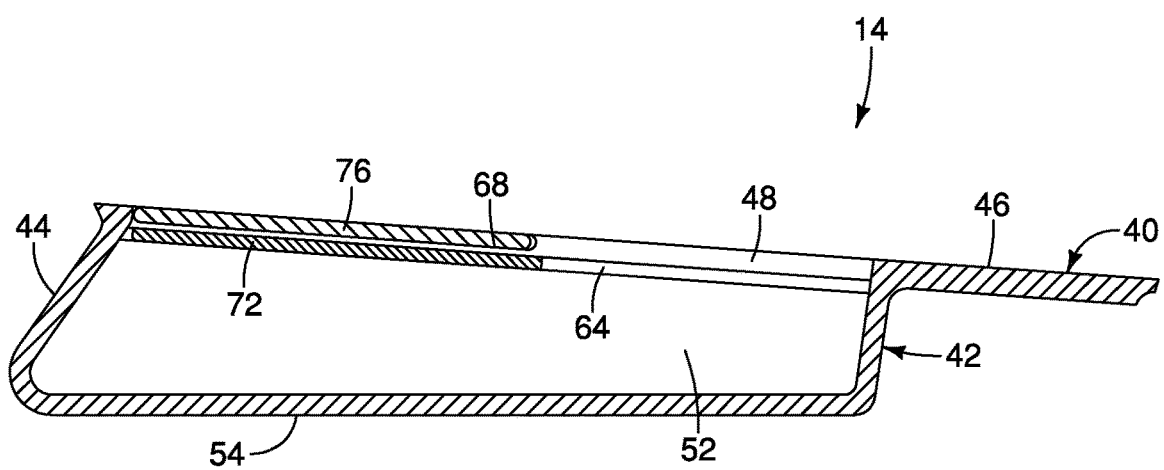
FIG. 13 is still another cross-sectional side view of the storage structure similar to FIGS. 10-12 showing the one of the sliding covers installed to the elongated track portions side to the open orientation with the fixed cover installed to the recesses in accordance with the one embodiment.

As shown in FIGS. 11 and 12, once the sliding cover 72 is installed to the elongated track portion 64, the fixed cover 76 is non-movably fitted into the recessed areas 66. The fixed cover 76 is held in place between the recessed areas 66 either by a snap-fit engagement or via mechanical fasteners (not shown). Alternatively, an adhesive material can be used to attach the fixed cover 76 to the storage structure 14. Once the fixed cover 76 is installed to the storage structure 14, the access areas 68 are covered with the fixed cover 76 now defining forward upper portions of the elongated track portion 64, thereby confining and retaining the sliding cover 72 for sliding movement within the elongated track portions 64.

Figure 20:
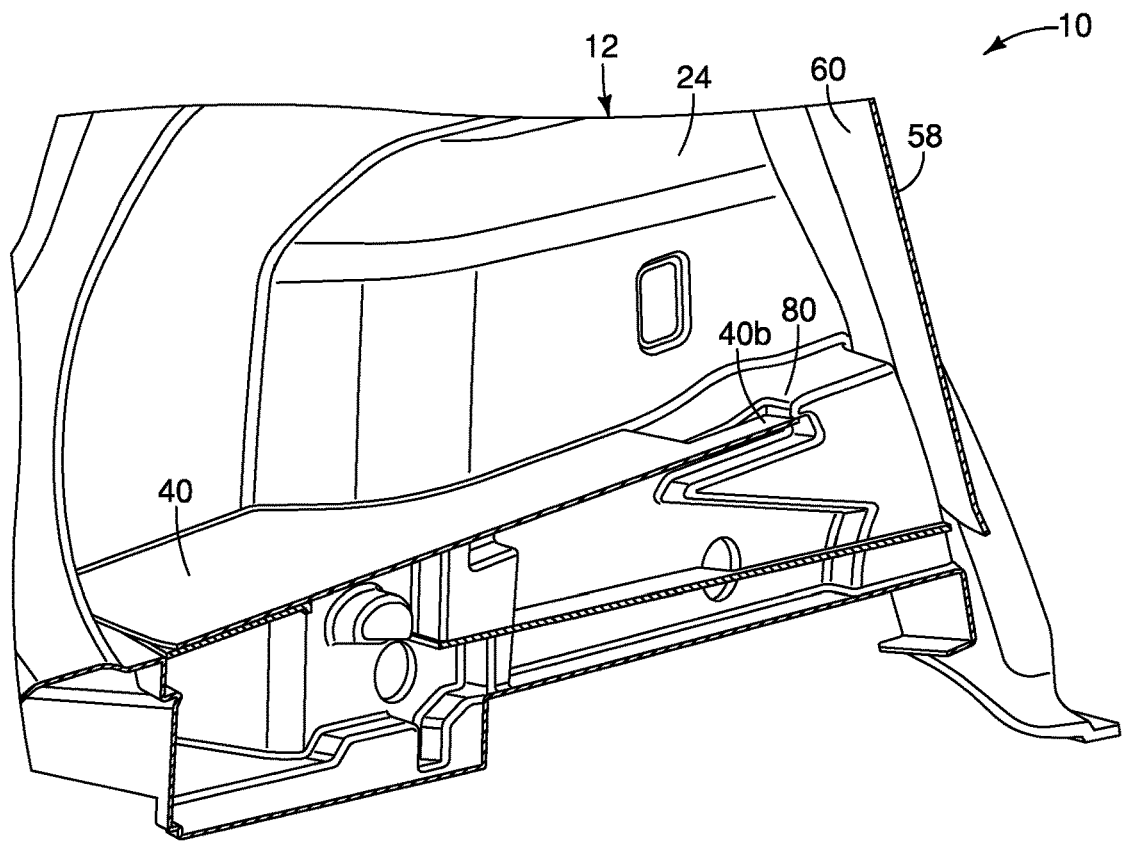
FIG. 20 is a cross-sectional view of one side of the storage structure and second side wall showing a forward edge of the storage structure retained by a protrusion of the second side wall in accordance with the one embodiment.
Figure 21:
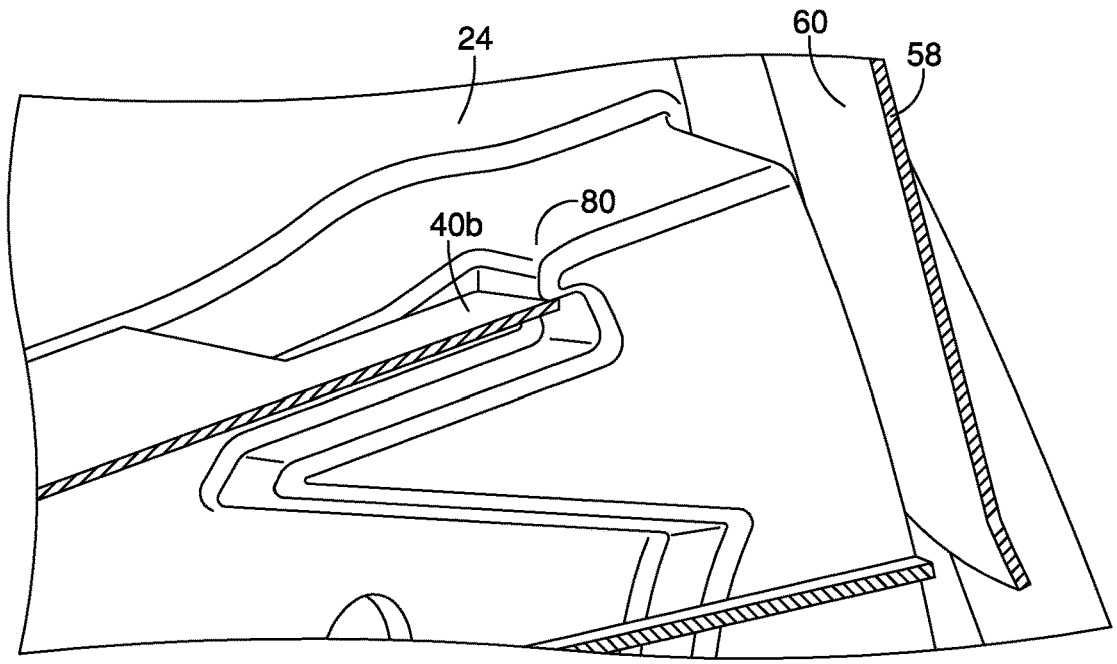
FIG. 21 is another cross-sectional view of one side of the storage structure and second side wall showing the forward edge of the storage structure extending under the protrusion of the second side wall in accordance with the one embodiment.

The storage structure 14 is dimensioned and contoured to removably install to the rear interior cargo area 16 of the vehicle 10 (a passenger vehicle). Specifically, the storage structure 14 is shaped and dimensioned to be easily installed and removed from the rear interior cargo area 16. The storage structure 14 can be held in place via removable mechanical fasteners (not shown), or can be retained in position by gravity, once installed. Additionally, the side walls can include projecting portions 80, as shown in FIGS. 20 and 21. One projecting portion 80 is shown in FIGS. 20 and 21 extending from the second side wall 24. However, it should be understood from the drawings and the description herein that another one of the projecting portions 80 can be included the first side wall 22.

A gap is defined beneath the projecting portions 80. Corners 40b of the upper panel 40 can be positioned in the gaps beneath the projecting portions 80 in order to retain the storage structure 14 within the rear interior cargo area 16.

The various structures and features of the vehicle 10 shown in the drawings (other than the storage structure 14) are conventional components that are well known in the art. Since such structures and features are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The term "configured" as used herein to describe a component, section or part of a device includes structure that is constructed and/or designed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure, comprising:
a storage structure having an upper surface defining at least one opening and a lower surface with at least one storage space defined between the upper surface and the lower surface, the at least one opening exposing the at least one storage space;
at least one fixed cover non-movably fitted to the storage structure covering a first portion of the at least one storage space; and
at least one sliding cover installed to the storage structure for sliding movement over the opening such that in a closed orientation, the at least one sliding cover covers a second portion of at least one storage space such that the at least one fixed cover and the at least one sliding cover completely conceal the at least one storage space, and, in an open orientation the at least one sliding cover exposes the second portion of the at least one storage space, the storage structure being dimensioned and contoured to removably install to a rear interior cargo area of a passenger vehicle.

2. The vehicle body structure according to claim 1, wherein
the upper surface and the lower surface are not parallel to one another.

3. The vehicle body structure according to claim 1, wherein
the storage structure further including upright walls that extend between the upper surface and the lower surface with the at least one storage space being further defined by the side walls.

4. The vehicle body structure according to claim 1, wherein
the upper surface is defined along an upper wall of the storage structure, the upper wall having a first section that extends over the at least one storage space and a second section that is cantilevered away from the at least one storage space.

5. The vehicle body structure according to claim 1, wherein
the at least one storage space includes three storages spaces that are separate and spaced apart from one another, the upper surface of the storage structure having three openings open to corresponding ones of the three storage spaces, and
the at least one fixed cover includes three fixed covers, and the at least one sliding cover includes three sliding covers.

6. The vehicle body structure according to claim 1, wherein
the storage structure includes at least one pair of elongated track portions that extend along opposite sides of the at least one opening dimensioned to receive the at least one sliding cover for movement between the closed orientation and the open orientation.

7. The vehicle body structure according to claim 6, wherein
the storage structure further includes at least one pair of recesses that extend along opposite sides of the at least one opening dimensioned to receive the at least one fixed cover.

8. The vehicle body structure according to claim 7, wherein
the at least one pair of recesses are located above the at least one pair of elongated tracks.

9. A vehicle body structure, comprising:
a vehicle floor;
a first side wall;
a second side wall;
a rear interior cargo area defined above the vehicle floor and between the first and second side walls,
a storage structure having an upper surface defining at least one opening, a lower surface with at least one storage space defined between the upper surface and the lower surface, the at least one opening exposing the at least one storage space, the storage structure being dimensioned and contoured to removably install to the rear interior cargo area;
at least one fixed cover non-movable fitted to the storage structure covering a first portion of the at least one storage space; and
at least one sliding cover installed to the storage structure for sliding movement over the opening such that in a closed orientation the at least one sliding cover covers a second portion of at least one storage space with the fixed cover completely and the at least one sliding cover completely covering and concealing the at least one storage space and in an open orientation, the at least one sliding cover exposes at least part of the second portion of the at least one storage space.

10. The vehicle body structure according to claim 9, wherein
the rear interior cargo area defines a spare tire storage space, and
the rear interior cargo area includes a tire cover panel configured to install between the first and second side walls covering the spare tire storage space.

11. The vehicle body structure according to claim 9, wherein
the upper surface and the lower surface are not parallel to one another.

12. The vehicle body structure according to claim 9, wherein
the storage structure further including upright walls that extend between the upper surface and the lower surface with the at least one storage space being further defined by the side walls.

13. The vehicle body structure according to claim 12, wherein
the lower surface and the upright walls are defined along a single, unitary, monolithic member that is formed as a single member.

14. The vehicle body structure according to claim 13, wherein
the upper surface is defined along an upper panel that is attached to the upright walls of the storage structure, the upper panel having a first section that extends over the at least one storage space and a second section that is cantilevered away from the at least one storage space.

15. The vehicle body structure according to claim 9, wherein
the upper surface is defined along an upper panel of the storage structure, the upper panel having a first section that extends over the at least one storage space and a second section that is cantilevered away from the at least one storage space.

16. The vehicle body structure according to claim 9, wherein
the upper surface is defined along an upper panel of the storage structure, the upper panel having a first section that extends over the at least one storage space and a second section that is attached to the first section and extends away from the at least one storage space.

17. The vehicle body structure according to claim 9, wherein
the at least one storage space includes three storages spaces that are separate and spaced apart from one another, the upper surface of the storage structure having three openings open to corresponding ones of the three storage spaces, and
the at least one fixed cover includes three fixed covers, and the at least one sliding cover includes three sliding covers.

18. The vehicle body structure according to claim 9, wherein
the storage structure includes at least one pair of elongated track portions that extend along opposite sides of the at least one opening dimensioned to receive the at least one sliding cover for movement between the closed orientation and the open orientation.

19. The vehicle body structure according to claim 18, wherein
the storage structure further includes at least one pair of recesses that extend along opposite sides of the at least one opening dimensioned to receive the at least one fixed cover.

20. The vehicle body structure according to claim 19, wherein
the at least one pair of recesses are located above the at least one pair of elongated tracks.

* * * * *